United States Patent
Kadowaki et al.

(10) Patent No.: US 7,261,866 B1
(45) Date of Patent: Aug. 28, 2007

(54) CO REMOVER THAT IS SIMPLE IN STRUCTURE AND PERFORMS A SELECTIVE REACTION OF CO AT A HIGH CO SELECTIVITY

(75) Inventors: Masataka Kadowaki, Hirakata (JP); Yasuo Miyake, Ora-Gun (JP)

(73) Assignee: Sanyo Electric Co., Ltd, Moriguchi, Osaka (JP)

( * ) Notice: Subject to any disclaimer, the term of this patent is extended or adjusted under 35 U.S.C. 154(b) by 0 days.

(21) Appl. No.: 09/507,079

(22) Filed: Feb. 18, 2000

(30) Foreign Application Priority Data

Feb. 19, 1999 (JP) ................................. 11-042231

(51) Int. Cl.
*B01J 19/00* (2006.01)
*F28D 21/00* (2006.01)
*B01D 53/34* (2006.01)

(52) U.S. Cl. ............... 422/198; 422/202; 422/180; 422/205; 422/222; 422/224; 422/228; 422/173; 422/171; 48/61; 48/128

(58) Field of Classification Search .......... 48/128, 48/127.9, 198.3, 198.7, 197; 422/188, 190, 422/191, 193, 195, 198, 200, 201, 202, 205, 422/211, 228, 177
See application file for complete search history.

(56) References Cited

U.S. PATENT DOCUMENTS

| | | | |
|---|---|---|---|
| 2,887,365 A | 5/1959 | De Rycker et al. | |
| 4,089,654 A | 5/1978 | Polinski et al. | |
| 4,539,267 A | 9/1985 | Sederquist | |
| 5,302,470 A | 4/1994 | Okada | |
| 5,330,727 A * | 7/1994 | Trocciola et al. | ........... 422/177 |
| 5,702,838 A * | 12/1997 | Yasumoto et al. | ........... 429/40 |
| 5,714,276 A | 2/1998 | Okamoto | |
| 5,733,675 A | 3/1998 | Dederer | |
| 5,750,076 A * | 5/1998 | Buswell et al. | ........... 422/115 |
| 5,874,051 A * | 2/1999 | Heil et al. | ........... 422/171 |
| 6,132,689 A * | 10/2000 | Skala et al. | ........... 422/193 |
| 6,162,558 A * | 12/2000 | Borup et al. | ........... 429/19 |
| 6,562,088 B2 * | 5/2003 | Ukai et al. | ........... 48/197 R |

FOREIGN PATENT DOCUMENTS

| | | |
|---|---|---|
| JP | 08047621 A | 2/1996 |
| JP | 08100184 A | 4/1996 |
| JP | 52-48572 | 2/1999 |
| JP | 11-302001 | 11/1999 |

* cited by examiner

*Primary Examiner*—Glenn Caldarola
*Assistant Examiner*—Kaity Handal
(74) *Attorney, Agent, or Firm*—Merchant & Gould P.C.

(57) ABSTRACT

The CO remover of this invention includes an air mixer for mixing air with hydrogen-rich gas including carbon monoxide and a selective oxidative catalytic device in which a selective oxidative catalyst bed is formed by filling selective oxidative catalyst into a gas passing tube. The selective oxidative catalytic device includes a gas blending unit for blending gas passing through the central part of the gas passing tube with gas passing through the peripheral part at a point in the selective oxidative catalyst bed in the direction of gas flow. As a result, the reaction apparatus and the CO remover have simple structures. In addition, gas passing through the central part upstream is blended with gas passing through the peripheral part upstream to uniformize the temperature of gas in the gas blending unit, so that high CO selectivity is obtained.

8 Claims, 10 Drawing Sheets

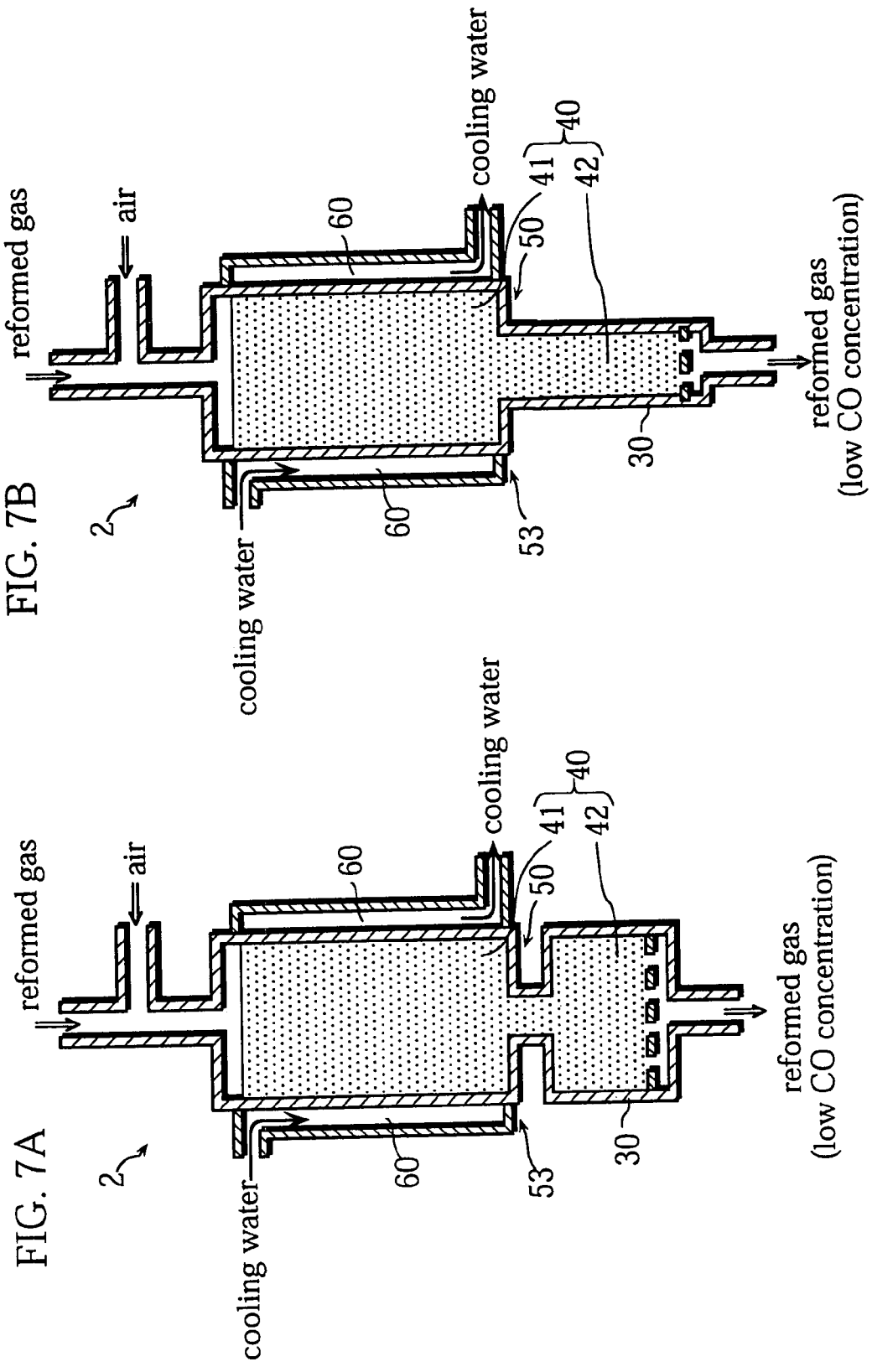

CO REMOVER THAT IS SIMPLE IN STRUCTURE AND PERFORMS A SELECTIVE REACTION OF CO AT A HIGH CO SELECTIVITY

This application is based on an application No. 11-042231 filed in Japan, the content of which is hereby incorporated by reference.

BACKGROUND OF THE INVENTION (1) Field of the Invention

The present invention relates to a reactor that has gas perform a catalytic reaction with exothermic reaction, and especially relates to a CO remover used for a fuel-cell generator system.

(2) Related Art

Generally speaking, in a fuel-cell generator system, an electrochemical reaction of hydrogen-rich gas that is supplied to the fuel electrode of the fuel cell and air that is supplied to the air electrode generates electricity.

This hydrogen-rich gas is obtained by steam reforming of the mixture of water vapor and fuel by a reformer 101 as shown in FIG. 1. The fuel is alcohol such as methanol and light hydrocarbon such as natural gas and naphtha, which is easily available and is not expensive.

During the steam reforming reaction in the reformer 101, a high temperature is applied to a catalyst bed for reforming, and hydrogen is generated and carbon monoxide is generated as by-products.

For the fuel electrode of a fuel cell 104, catalyst such as platinum is used, however, carbon monoxide deteriorates the catalyst to lower the power generation performance. In order to prevent the deterioration, a CO shift converter 102 is disposed downstream from the reformer 101 in many fuel-cell generator system to transform carbon monoxide using water vapor as described below so that carbon monoxide with a lower concentration is supplied to the fuel cell 104.

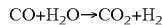

Note that the CO shift converter 102 decreases the concentration of carbon monoxide only to around one % when the S/C (Steam by Carbon) in the steam reformer 101 is 2.5, for instance. In the case of a PEFC (Polymer Electrolyte Fuel Cell), which operates at a relatively low temperature, the concentration of the carbon monoxide in reformed gas needs to be lowered since the electrode catalyst is more likely to deteriorate.

For instance, the carbon monoxide concentration in reformed gas is lowered according to the fuel-cell generator system disclosed in Japanese Patent Laying-Open Publication No 8-100184. In the fuel-cell generator system, a CO remover 103 is disposed to add a small amount of air to reformed gas. Then, the reformed gas is passed through a selective oxidative catalyst bed to eliminate carbon monoxide by selectively oxidizing the reformed gas as described in a reaction formula below, and is supplied to the fuel cell 104.

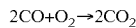

In the CO remover, it is required to keep proper selectivity, i.e., to maximize the combustion of carbon monoxide with minimizing the combustion of hydrogen. For this purpose, it is important to keep the temperature of the selective oxidative catalyst bed in a proper range. Although different in kind of catalyst, the well-known proper range of temperature is from 140 to 190° C. for a ruthenium catalyst, for instance. When the temperature of the selective oxidative catalyst bed is higher than this range of temperature, the proper selectivity in oxidation is not kept. On the other hand, when the temperature is lower than this range, the combustion of carbon monoxide is not effectively performed.

In the selective oxidative catalyst bed, heat is generated by a selective oxidative reaction of gas. In order to keep the temperature of the oxidative catalyst bed in the range, the oxidative catalyst bed is cooled during the operation of the CO remover.

Note that, in such a CO remover, the reaction of reformed gas and air tend to be accelerated in the selective oxidative catalyst bed around the entrance of the CO remover where reformed gas and air come into first contact with the selective oxidative catalyst bed. As a result, the temperature around the entrance tend to be high and almost oxygen tend to be consumed here. When oxygen is consumed on the entrance side, the exit side is short of oxygen and a methane formation reaction tends to be caused as a side reaction.

As a result, in order to prevent side reactions and obtain high CO selectivity in the CO remover, it is required to keep the temperature of the selective oxidative catalyst bed in the proper temperature range and to control the selective oxidative reaction so that the selective oxidative reaction is performed evenly from the entrance side to the exit side of the CO remover in the selective oxidative catalyst bed.

It seems that precise control of air supply and cooling in each part of the selective oxidative catalyst bed easily realize such control. It is difficult, however, to precisely control the temperature in the CO remover that is simple in structure.

For instance, a well-known CO remover that is simple in structure has the structure described below. The CO remover is equipped with a selective oxidative catalytic device in which a cylindrical tube is filled with selective oxidative catalyst. In the CO remover, reformed gas and air are mixed and injected into the entrance of the cylindrical tube, and cooling water to cool the selective oxidative catalyst bed is supplied around the cylindrical tube to control the temperature of the selective oxidative catalyst bed. In this case, part of the selective oxidative catalyst bed that is nearer to the inner surface of the cylindrical tube (this part of the selective oxidative catalyst bed is called "peripheral part" in this specification) is closer to the cooling water, so that the temperature of the peripheral part of the selective oxidative catalyst bed tends to be relatively low and the temperature of part of the selective oxidative catalyst bed that is further from the inner surface of the cylindrical tube (this part of the selective oxidative catalyst bed is called "central part" in this specification) tends to be relatively high. As a result, even if the cooling is controlled so that the central part in the selective oxidative catalyst bed has a proper temperature, gas passing through the peripheral part has a temperature that is lower than the proper one, so that the reaction is not performed well and the CO selectivity is low. On the other hand, when it is controlled so that the peripheral part of the selective oxidative catalyst bed has a proper one, the central part tends to have a too high temperature and oxygen tends to be consumed around the entrance.

In order to solve the problems, the CO remover disclosed in Japanese Patent Laying-Open Publication No 8-47621 is equipped with first, second, and third reactors in this order from the upstream of the fuel gas. In the CO remover, air is separately supplied to each of the reactors, or the catalyst filling density of the selective oxidative catalyst bed is controlled so that the density is relatively low on the entrance side. This structure is effective to have the reaction performed evenly from the entrance side to the exit side and to obtain proper temperatures of the selective oxidative catalyst bed. In this case, however, it is required to provide a mechanism for allocating air or to control the filling density of the catalyst, so that the CO remover is not simple in structure.

Note that the problems described above are shared by not only a CO remover but also a reactor that supplies gas to a catalytic reaction device and has the gas undergo a reaction with exothermic reaction by having the gas pass through the catalytic reaction device.

SUMMARY OF THE INVENTION

It is accordingly the object of the present invention to provide a reaction apparatus that is simple in structure and performs a desired reaction at high CO selectivity with restricted side reactions, especially a CO remover that performs a CO-selective oxidative reaction at a high CO selectivity.

The above-mentioned object may be achieved by a CO remover that may include: an air mixer for mixing air with hydrogen-rich gas including CO to generate mixed gas; and a selective oxidative catalytic device for selectively oxidizing the CO by having the mixed gas pass through a selective oxidative catalyst bed, the selective oxidative catalytic device including a gas passing tube that has the selective oxidative catalyst bed, and a gas blending unit for blending part of the mixed gas that is passing through the selective oxidative catalyst bed further from an inner surface of the gas passing tube and remaining part of the mixed gas that is passing through the selective oxidative catalyst bed nearer to the inner surface of the gas passing tube at a point within the selective oxidative catalyst bed.

In the CO remover, the hydrogen-rich gas including carbon monoxide undergoes a selective oxidative reaction while passing through upstream part of the selective oxidative catalyst bed after mixed with the air.

In the upstream part of the selective oxidative catalyst bed is cooled from the outside, so that gas passing through the central part has a relatively high temperature and gas passing through the peripheral part has a relatively low temperature. Under the circumstances, when the cooling is controlled so that the temperature of the central part of the selective oxidative catalyst bed is an appropriate one, the gas passing through the central part reacts well in the selective oxidative catalyst bed. On the other hand, the gas passing through the peripheral part has a lower temperature and passes through the upstream part of the selective oxidative catalyst bed without undergoing the reaction well. As a result, the gas passing through the peripheral part in the upstream part of the selective oxidative catalyst bed includes carbon monoxide and air that have not undergone a reaction to some extent.

Meanwhile, the central part gas in the upstream part is blended with the peripheral part gas in the gas blending unit and the blended gas has a uniformized temperature.

Then, the carbon monoxide and air in the peripheral gas that have undergone no reaction are transferred to the blended gas, and undergoes the selective oxidative reaction when the blended gas passes through the downstream part of the selective oxidative catalyst bed.

As a result, the selective oxidative reaction is undergone without excessively high temperatures in either of the upstream and downstream parts of the selective oxidative catalyst bed, so that high CO selectivity can be obtained.

In addition, the air mixer disposed upstream from the selective oxidation catalytic device mixes air, and no air distribution mechanism is needed. In this respect, the CO remover is simple in structure.

When the temperature of gas that is to be injected into the upstream part of the selective oxidative catalyst bed, it is not always necessary to cool the upstream part in order to adjust the temperature of the central part of the selective oxidative catalyst bed at an appropriate one. Generally speaking, however, it is preferable to dispose a cooling unit by which the selective oxidative catalyst bed is forced to be cooled upstream from the gas blending unit. It is especially preferable to cool the upstream part from the outside with water or air in order to make the structure of the cooling unit simple.

The gas blending unit is easily formed by disposing a washer ring element on the inner surface of the gas passing tube. Also, the cooling unit has a simple structure since it is enough to cool the selective oxidative catalyst bed from the outside.

As a result, the CO remover of this invention can be simple in structure as a whole.

Note that the present invention can be adopted with the same level of effectiveness not only for a CO remover but also for a reaction-apparatus that supplies gas to a catalytic reaction device and has the gas undergo a reaction with exothermic reaction by having the gas pass through the catalytic reaction device.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIGS. 7A and 7B show overall structures of CO removers according to the first embodiment of the present invention;

DESCRIPTION OF THE PREFERRED EMBODIMENTS

The First Embodiment

Figure 2:
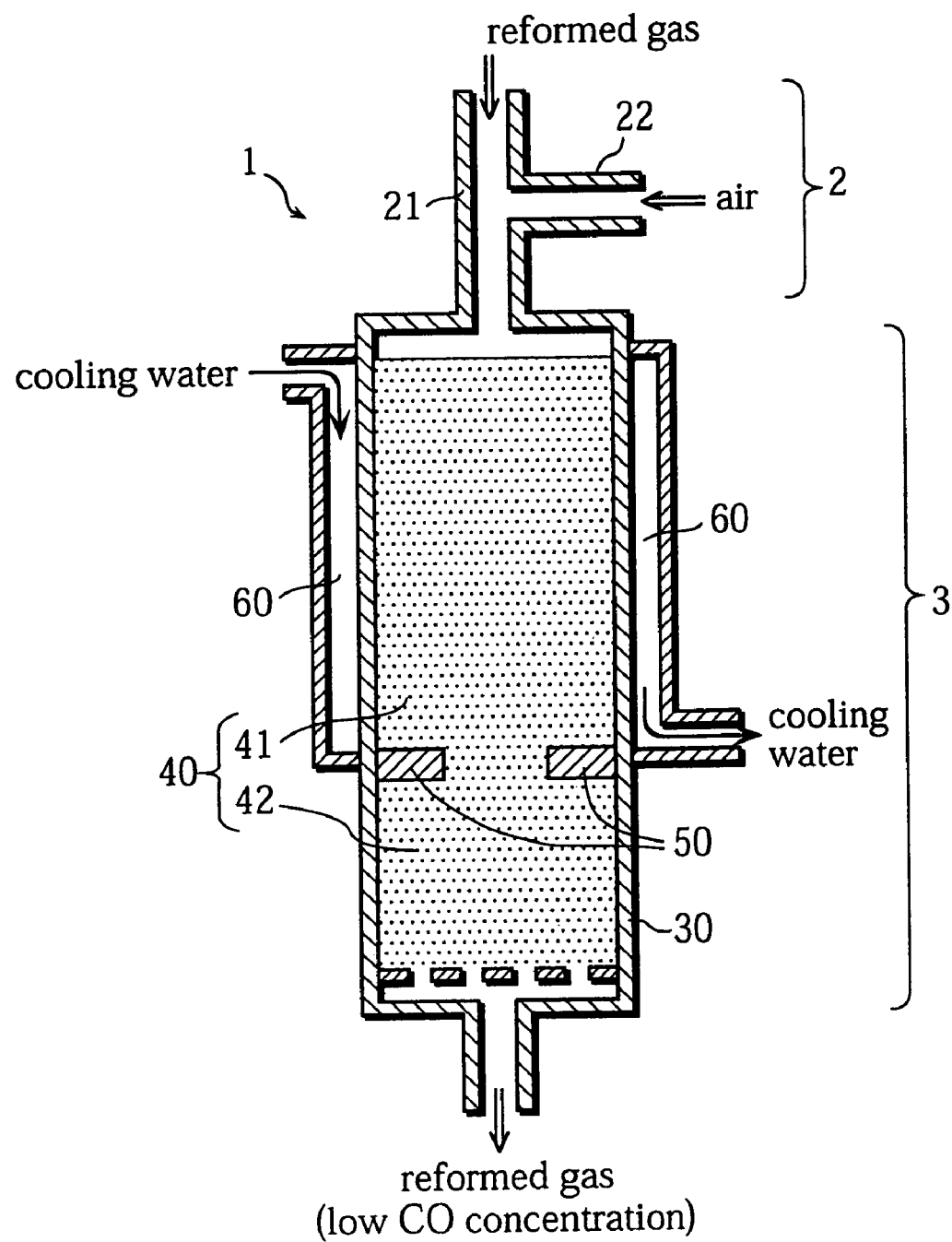
FIG. 2 shows an overall structure of a CO remover according to the first embodiment of the present invention.
Figure 3:
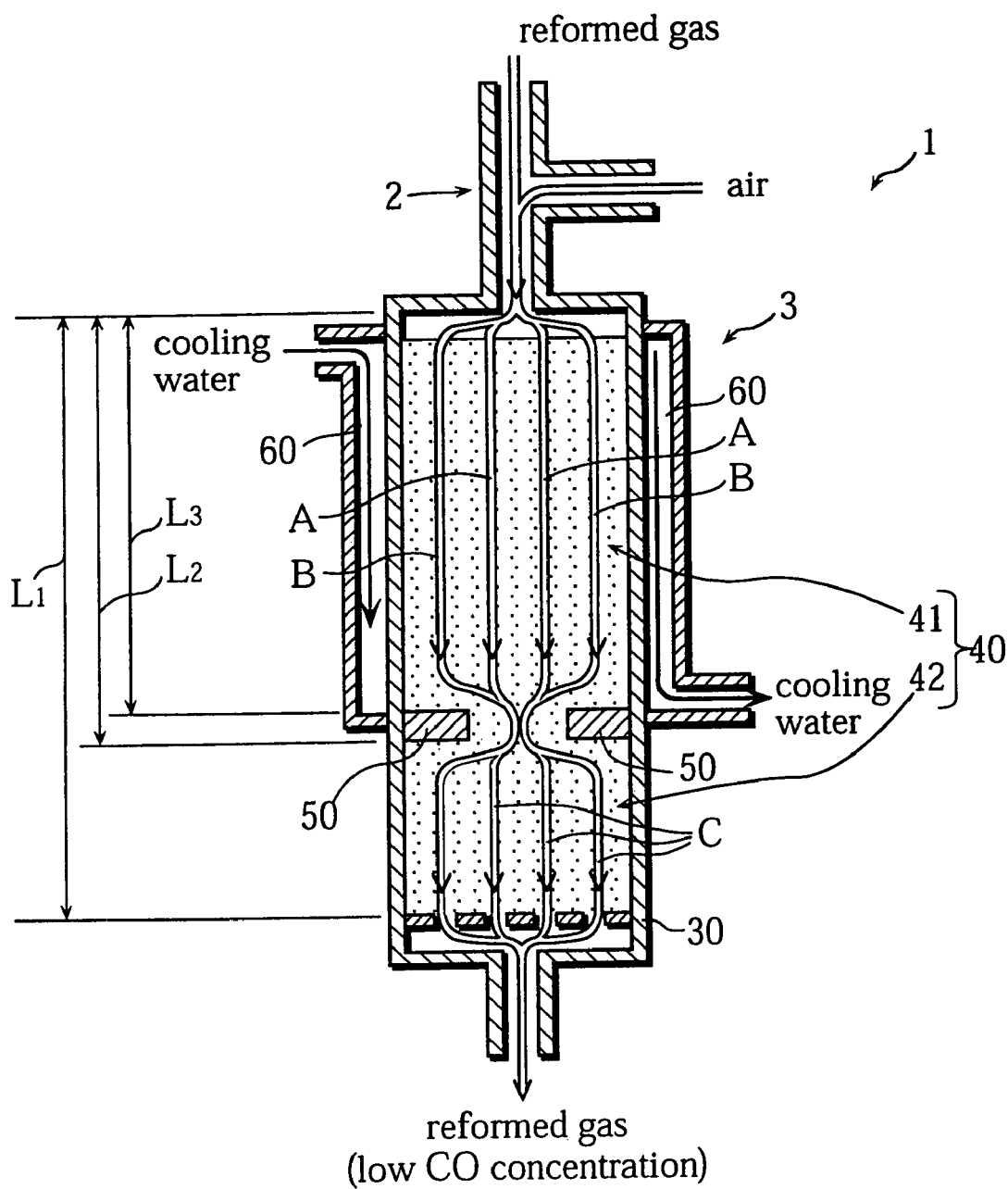
FIG. 3 is an illustration of the operation by the CO remover shown in FIG. 2.

FIG. 2 shows an overall structure of a CO remover according to the first embodiment of the present invention. FIG. 3 is an illustration of the operation by the CO remover.

Figure 1:
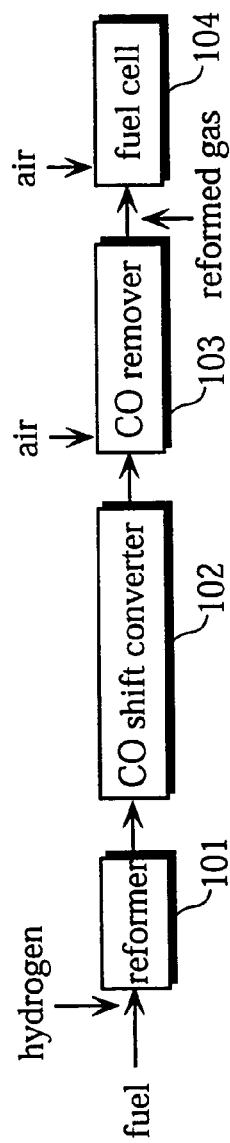
FIG. 1 shows an overall structure of a typical fuel-cell generator system.

As in the case of the CO remover 103 shown in FIG. 1, the CO remover 1 supplies reformed gas after removing carbon monoxide from the reformed gas (hydrogen-rich gas including carbon monoxide) that has been generated in a reformer and a CO shift converter. The CO remover 1 includes an air mixer 2 for mixing air with the reformed gas and a selective oxidative catalytic device 3.

The air mixer 2 mixes several % of air with the reformed gas that is to be injected into the selective oxidative catalytic device 3. An air mixer that has been generally used for conventional CO removers may be adopted.

In the air mixer 2, a pipe 22 into which air from an air pump (not illustrated) is injected joins a piping 21 into which the reformed gas is injected as shown in FIG. 2. During operation, the amount of air that is injected from the air pump is controlled so that the value of ratio of $O_2$ to CO is in a proper range by measuring the CO concentration in the reformed gas that passes through the pipe 21. Generally speaking, it is considered appropriate to set the value of the ratio of $O_2$ to CO in the range from 0.5 to 3.

As the air mixer 2, an ejector system can be used, which injects reformed gas from the nozzle and sucks in circumambient air, adopting an air suction system generally used in gas burners.

The selective oxidative catalytic device 3 includes a gas passing tube 30, a selective oxidative catalyst bed 40, a gas blending unit 50, and a cooling unit 60. The selective oxidative catalyst bed 40 is formed by filling selective catalyst in the gas passing tube 30. The gas blending unit 50 blends gas passing through the central and peripheral parts of the selective oxidative catalyst bed 40 in the gas passing tube 30 in the direction of the flow of gas. The cooling unit 60 is disposed to cool the selective oxidative catalyst bed 40 upstream from the gas blending unit 50.

Figure 4:
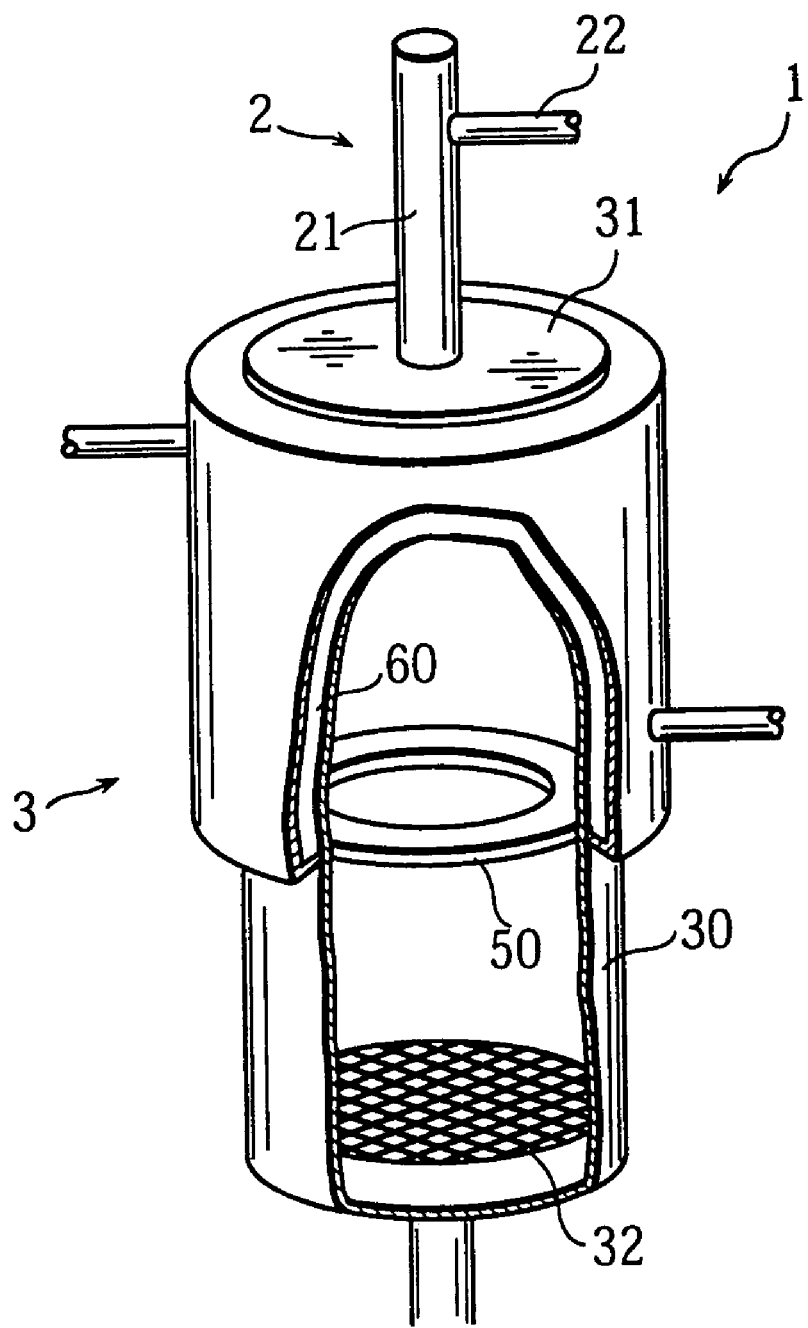
FIG. 4 is a perspective drawing of a specific example of the CO remover shown in FIG. 2.

FIG. 4 is a perspective drawing of an example of the CO remover 1. FIG. 4 shows a cylindrical CO remover. In order to indicate the internal structure of the selective oxidative catalytic device 3, the selective oxidative catalyst bed 40 is not shown in FIG. 4.

The top end of the gas passing tube 30 is covered with a lid 31, and the pipe 21 is connected to the lid 31. At the bottom of the gas passing tube 30, a mesh holding table 32 is set that holds selective oxidative catalyst on the top for forming the selective oxidative catalyst bed 40.

The lid 31 is removable for easy structure of the selective oxidative catalytic device 3 and easy refilling of the selective oxidative catalyst.

Note that although a cylindrical metal tube is generally used for the gas passing tube 30 as shown in FIG. 4, a quadrangular-prism-shaped tube can also used.

For the selective oxidative catalyst, selective oxidative catalyst that has been conventionally used for CO removers can be used. Note that although typical selective oxidative catalyst selectively oxidizes carbon monoxide in the temperature range from 100 to 250° C., catalyst that selectively oxidizes carbon monoxide in the range from several tens to around 150° C. has been developed.

A concrete example of selective oxidative catalyst includes at least one of the kinds of metal, platinum (Pt), gold (Au), rhodium (Rh), and ruthenium (Ru). Although the proper temperature range is different in kind of catalyst, the active temperature range (the temperature range for outstanding selective oxidation) of commercially available ruthenium catalyst is from 140 to 190° C.

The selective oxidative catalyst bed 40 is formed by filling catalyst that is held by a honeycomb alumina porous element, a granular alumina catalyst support, or granular zeolite.

Generally speaking, the volume is set so that the space velocity of the reformed gas that is to be injected from the pipe 21 against the selective oxidative catalyst is in the range from 1000 to 15,000 $hr^{-1}$.

The cooling unit 60 cools upstream part 41 of the selective oxidative catalyst bed 40 from the outside of the gas passing tube 30, especially the selective oxidative catalyst bed 40 around the entrance part of the gas passing tube 30 where the oxidation reaction is active.

The cooling unit 60 is generally a water-cooling-type one and air-cooling-type one, in which cooling medium flows to cool the selective oxidative catalyst bed 40.

In the case of a water-cooling-type cooling unit 60, a flowing path of cooling water are disposed along the side of the upstream part 41 of the selective oxidative catalyst bed 40.

More specifically, when the gas passing tube 30 is cylindrical, the gas passing tube 30 is put into another tube as shown in FIG. 4, and cooling water flows in an annular-shaped path between the gas passing tube 30 and the outer tube. By doing so, the cooling unit 60 that is simple in structure and cools the selective oxidative catalyst bed 40 from the outside is realized. The cooling unit 60 is also realized by winding a pipe for cooling water around the gas passing tube 30.

On the other hand, an air-cooling-type cooling unit 60 is realized by disposing a heat sink around the gas passing tube 30 instead of a cooling water flowing path. In this case, heat is dissipated into the atmosphere via the heat sink from the upstream part 41.

Figure 5A:
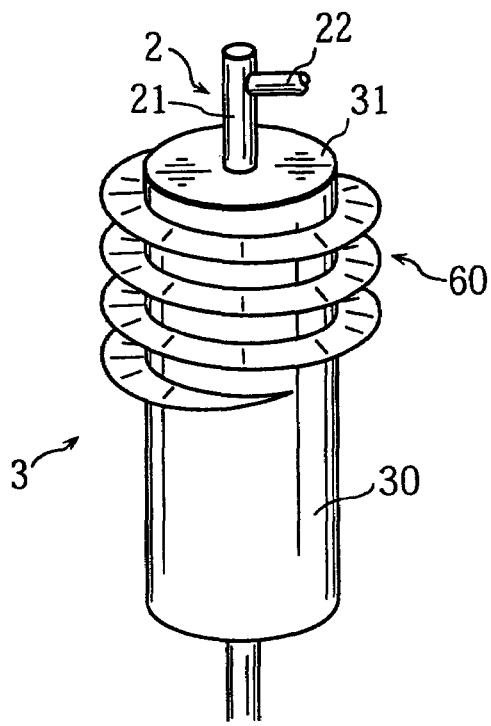
FIGS. 5A to 5C show examples of the CO remover shown in FIG. 2 when an air-cooling-type cooling unit is adopted.
Figure 5B:
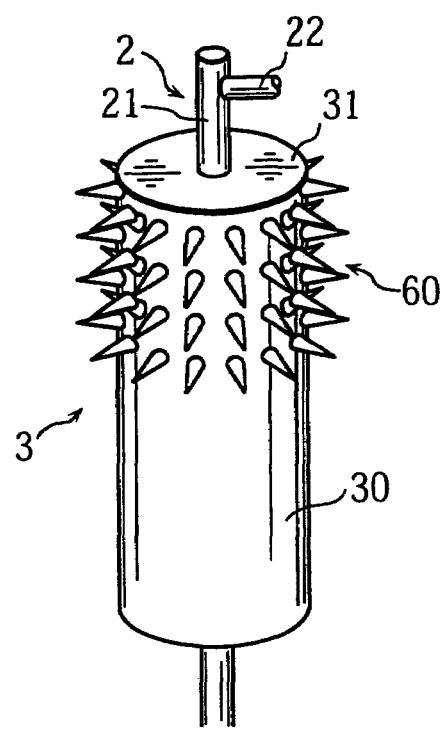
Figure 5C:
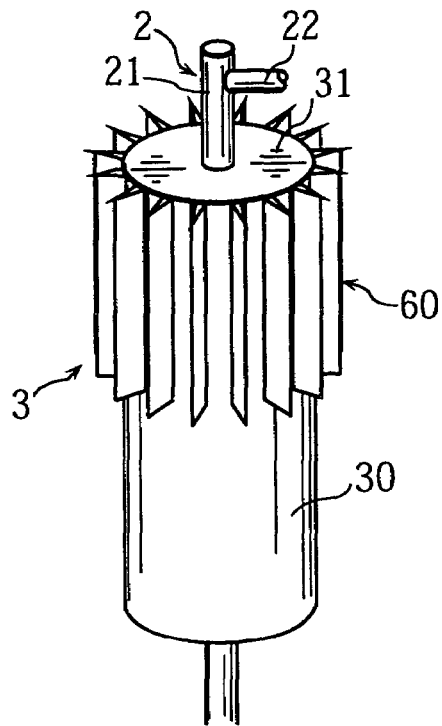

FIGS. 5A to 5C show examples of the CO remover 1 when the cooling unit 60 is formed around the upstream part 41 by disposing a heat sink on the periphery of the gas passing tube 30. In FIG. 5A, a spiral heat sink is attached on the periphery of the gas passing tube 30, in FIG. 5B, a heat sink including many prickles is attached, and in FIG. 5C, a heat sink including a plurality of ruler-shaped flat fins is attached so that the fins are set in the axial direction.

Apart from these examples, an air-cooling-type cooling unit 60 is realized by providing a fan so that air is forced to be supplied on the periphery of the gas passing tube 30 instead of disposing a heat sink.

An air-cooling-type cooling unit is more simple than a water-cooling-type cooling unit in structure. On the other hand, it is relatively easy to control the temperature of the peripheral part of the selective oxidative catalyst bed 40 so that the temperature is set around 100° C. in the case of a water-cooling-type cooling unit. In this regard, a water-cooling-type cooling unit is more preferable.

Here, an explanation of the functions of the gas blending unit 50 and the cooling unit 60 will be given.

Generally speaking, flows of gas pass through the catalyst bed almost in parallel. Flows of Gas that pass through the upstream part 41 of the selective oxidative catalyst bed 40 is no exception. Flows of gas passing through the central part of the upstream part 41 (indicated by arrows A in FIG. 3 and referred to "gas A" in this specification) are in parallel with flows of gas passing through the peripheral part of the upstream part 41 along the inner surface of the gas passing tube 30 (indicated by arrows B in FIG. 3 and referred to "gas B" in this specification), and the flows are not blended.

As a result, the gas B passes through the peripheral part of the upstream part 41, which are closer to the cooling unit 60, and the temperature of the gas B is lower than that of the gas A, which passes through part closer to the center of the upstream part 41.

Here, suppose that the gas A passing through the central part is cooled so that the temperature is appropriate to the selective oxidative reaction. In this case, while the selective oxidative reaction is well performed for the gas A in the upstream part 41, the gas B passing through the upstream part 41 undergoes inadequate selective oxidative reaction. As a result, the gas B includes carbon monoxide and air that have undergone no reaction.

The gas blending unit 50 makes the gas uniform that is to be guided to downstream part 42 by blending the gas A, which is passing through the central part and the gas B, which is passing through the peripheral part.

The gas that has passed the gas blending unit 50 (indicated by arrows C in FIG. 3 and referred to "gas C" in this specification) is the mixture of the gas A and the gas B, and the ingredients and the temperature are uniformized in the gas C. As a result, the gas C has a higher temperature than the gas B, and the carbon monoxide and the air included in the gas C that have undergone no reaction are to undergo the selective oxidative reaction when the gas C passes through the downstream part 42.

Note that the points described below. In the selective oxidative catalyst bed 40 itself, gas is blended to some extent since the gas is diffused to some extent according to the shape of the catalyst support. But the gas A, which is passing through the central part and the gas B, which is passing through the peripheral part are not blended to the extent that the gas A and B are uniformized. The gas blending unit 50 has a stronger function of blending than a typical catalyst bed. An explanation of the desirable form of the gas blending unit 50 will be given later.

(Positions of the Gas Blending unit 50 and the Cooling Unit 60)

The gas blending unit 50 should be set at the position so that the volume of the upstream part 41 is at least ⅓ of that of the selective oxidative catalyst bed 40. This is because if the ratio of the volume of the upstream part 41 to that of the selective oxidative catalyst bed 40 is smaller than ⅓, gas is blended in the selective oxidative catalyst bed 40 near the entrance of the selective oxidative catalytic device 3, so that an excessive reaction is performed and the temperature tends to be high in the upstream part 41, and the amount of oxygen tends to be insufficient in the downstream part 42.

More specifically, suppose that the length between the end of the selective oxidative catalyst bed 40 on the entrance side of the selective oxidative catalytic device 3 and the end on the exit side of the selective oxidative catalytic device 3 is set as "L1" and the length between the end of the selective oxidative catalyst bed 40 on the entrance side of the selective oxidative catalytic device 3 and the gas blending unit 50 is set as "L2", it is preferable to set the position of the gas blending unit 50 as indicated by the equation below.

$$L2/L1 \geq 1/3$$

Generally speaking, set at one position, the gas blending unit 50 is set in at least two positions as necessary.

An explanation of the reason will be given below with reference to FIG. 2. Even in the case of the gas C, which passes through the downstream part 42, the flows of gas passing through the peripheral part tends to be cooled more than the flows of gas passing through the central part. As a result, the reaction speed in the peripheral part may tend to be gradually reduced, especially, when the length of the downstream part 42 in the direction of gas flow is relatively long.

Accordingly, it is preferable to prevent the reaction speed from being reduced by setting the gas blending unit 50 in the downstream part 42, i.e., by setting the gas blending unit 50 in at least two places.

Note that when the gas blending unit 50 is set in at least two places, it is preferable that the gas blending unit 50 is set in at least one position in the range of ⅓≦L2/L1≦½ and in at least one position in the range of ⅔≦L2/L1≦⅘.

Regarding the position to set the cooling unit 60, it is necessary that the cooling unit 60 covers at least ¼ of the length of the selective oxidative catalyst bed 40 in the direction of the gas flow from the end on the entrance side of the selective oxidative catalytic device 3 to the downstream in order to prevent an excessive oxidation reaction in the selective oxidative catalyst bed 40 around the entrance of the selective oxidative catalytic device 3. More specifically, suppose that the length which is covered by the cooling unit 60 in the direction of the gas flow (the length of area that is cooled) is "L3", it is preferable to set the cooling unit 60 as indicated by the equation below.

$$1/4 \leq L3/L1$$

In the case of a water-cooling-type cooling unit, it is preferable to set the cooling unit so that L3/L1 is about ½ although the ratio is different in the shape of the selective oxidative catalyst bed 40 and operation conditions.

During the operation, cooling medium is passed through the cooling unit 60 so that the central part of the selective oxidative catalyst bed 40 have appropriate temperatures (generally, about 140 to 190° C.) in the upstream part 41.

In the case of the CO remover in FIG. 4, cooling water is injected into the cooling unit 60 from a water pump (not illustrated). The temperature of the selective oxidative catalyst bed 40 tends to be highest in the central part near the entrance of the selective oxidative catalytic device 3. As a result, the amount of cooling water passing through the cooling unit 60 is controlled so that the temperature of the central part around the entrance side of the selective oxidative catalyst bed 40 is in the appropriate range, with the temperature being watched.

On the other hand, in the case of air-cooling-type cooling unit, it is necessary to set the length of the area to be cooled, i.e., "L3" as longer than in the case of water-cooling-type cooling unit, since the cooling power of the air-cooling-type cooling unit is weaker than that of the water-cooling-type cooling unit.

While the cooling unit 60 cools the selective oxidative catalyst bed 40 from the outside in the present embodiment, it is possible to cool the selective oxidative catalyst bed 40 from the inner side by setting a pipe for cooling water in the upstream part 41 around the entrance side, for instance.

(Form of the Gas Blending unit 50)

An explanation of a variety of forms of the gas blending unit 50 will be given below by taking specific examples.

① An explanation of the typical form of the gas blending unit 50 will be given first. The gas blending unit includes a projected element that is circularly disposed along the inner surface of the gas passing tube 30 in order to obstruct the flow of the gas B, which is passing through the peripheral part.

In this case, the gas B, the flow of which has been obstructed by the projected elements, is guided to the central part, so that the gas B is blended with the gas A, which is passing through the peripheral part, and the mixture of the gas A and B is guided into the downstream part 42 of the selective oxidative catalyst bed 40 (refer to FIG. 3).

As the material of the elements included in the gas blending unit 50, metal and a heat-resistant resin such as PTFE (polytetrafluoroethylene) is used.

As a specific example of this form, the gas blending unit 50 is formed by disposing a washer ring element on the inner surface of the gas passing tube 30 as shown in FIG. 4 when the gas passing tube 30 is cylindrical.

Simple in shape, this washer ring element is easy to manufacture and to attach to the inside of the gas passing tube 30 with parts or by welding.

When the gas passing tube 30 is cylindrical and a washer ring element is used for the gas blending unit 50 as has been described, it is preferable to set the width of the washer ring element in the direction of the radius as at least 5% of the internal radius of the gas passing tube 30 in order to guide the gas B, which is passing through the peripheral part, to the central part for the blending. Meanwhile, it is preferable to set the aperture ratio (the ratio of aperture area of the washer ring element to the internal sectional area of the gas passing tube 30) as no greater than 90%.

In addition, the larger the width of the washer ring element in the direction of the radius, the more improved the effect of blending. When the ratio of the width to the internal radius is no less than 50%, however, the effect of blending is hardly improved.

At the same time, when the ratio of the width of the washer ring element in the direction of the radius to the internal radius is set too large, the pressure loss is too much. As a result, it is preferable to set the width so that the pressure loss is no greater than 300 mmH$_2$O.

In this respect, it is preferable to set the ratio of the width of the washer ring element in the direction of the radius to the internal radius of the gas passing tube 30 as no greater than 90%, and it is more preferable to set the ratio as no greater than 50%. Meanwhile, it is preferable to set the aperture ratio as no less than 25%.

Figure 6A:
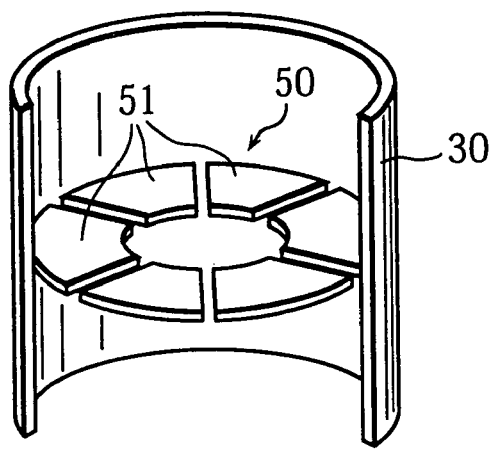
FIGS. 6A to 6D are perspective drawings of other possible modifications of a blending unit in the CO remover shown in FIG. 2.

As another possible modification of the washer ring element, a plurality of plate elements 51 can be circularly disposed along the inner surface of the gas passing tube 30 as shown in FIG. 6A to form the gas blending unit 50.

Figure 6B:
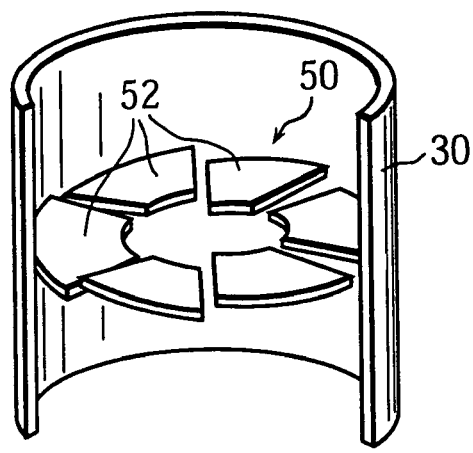

In addition, as a possible modification of the plate elements in FIG. 6A, a plurality of plate elements 52 can be circularly disposed along the inner surface of the gas passing tube 30 at an angle to the direction of the radius of the gas passing tube 30 as shown in FIG. 6B to form the gas blending unit 50.

By disposing the plate elements 52 at an angle like the blades of a propeller as shown in FIG. 6B, gas that has been guided to the downstream part 42 of the selective oxidative catalyst bed 40 is blended while the gas B, which is passing through the peripheral part, is guided to the central part to be blended with the gas A, which is passing through the central part.

When a plurality of plate elements form the gas blending unit 50 as has been described, it is preferable to set the width of the plate elements in the direction of the radius larger than that of a washer ring element in order to guide the gas B, which is passing through the peripheral part, into the central part and blend gas effectively. More specifically, it is preferable to set the ratio of the width to the internal radium of the gas passing tube 30 as no less than 15%.

② An explanation of another form of the gas blending unit 50 will be given below that is formed by narrowing the diameter of the gas passing tube 30 compared with the diameter upstream at the position where the gas blending unit 50 is to be formed.

FIGS. 7A and 7B show overall structures of CO removers of this form. In the gas passing tube 30, a diameter narrowing part 53 is disposed, where the diameter of the gas passing tube 30 changes so that the diameter downstream is narrower than that upstream.

The diameter narrowing part 53 can be filled with the selective oxidative catalyst and can be empty.

As in the case of the gas blending units formed by disposing projected elements, the gas that is passing through the peripheral part is guided to the central part at the diameter narrowing part 53 to be blended with the gas that is passing through the central part, and the mixture of the gas is guided into the downstream part 42 of the selective oxidative catalyst bed 40 in this case.

Regarding the ratio of the diameter of the gas passing tube 30 downstream to the diameter upstream at the diameter narrowing part 53, it is preferable to set the ratio as no less than 10% and no greater than 95% (no greater than 90% in the case of the ratio of the internal sectional area downstream to the infernal sectional area upstream), considering the case of washer ring element, which has been described. It is more preferable to set the ratio as no less than 50% (no less than 25% in the case of the ratio of the internal sectional area downstream to the infernal sectional area upstream).

Note that the diameter of the gas passing tube 30 is expanded downstream from the gas blending unit 50 and the downstream part 42 and the upstream part 41 of the selective oxidative catalyst bed 40 have almost the same diameters in the example in FIG. 7A. On the other hand, the diameter of the gas passing tube 30 is the same downstream from the gas blending unit 50, so that the diameter of the downstream part 42 is smaller than that of the upstream part 41 in the example in FIG. 7B.

While the example in FIG. 7A blends gas as effectively as the example in FIG. 7B, the narrower the diameter of the downstream part 42, the longer the length of the downstream part 42 in the direction of the gas flow. As a result, it is advantageous to expand the diameter of the gas passing tube 30 downstream from the gas blending unit 50 as shown in FIG. 7A in order to make the apparatus more compact.

Figure 6C:
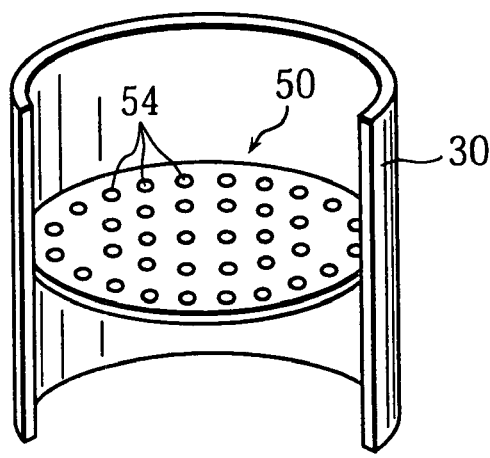
Figure 6D:
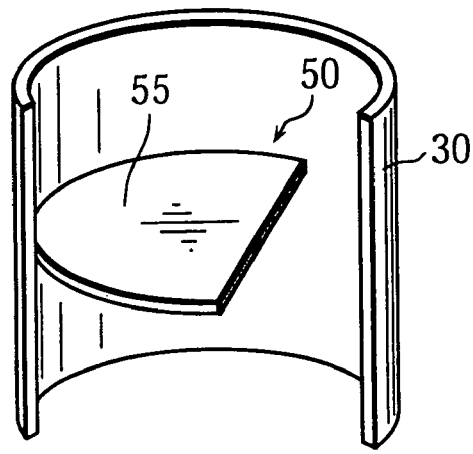

③ As other forms of the gas blending unit 50, a punching disc element 54 as shown in FIG. 6C, which is formed by punching many holes in a disc, and a partial disc element 55 as shown in FIG. 6D, which is formed by cutting off part of a disc, can be disposed in the gas passing tube 30 instead of the washer ring element as shown in FIG. 4. Also in this case, the gas passing through the peripheral part and the central part are blended together to be guided to the downstream part 42 of the selective oxidative catalyst bed 40.

In the case of the punching disc element 54, it is preferable to set the aperture ratio (the ratio of the total areas of the holes to the internal sectional area of the gas passing tube 30) so that the pressure loss is small (no greater than 300 mmH$_2$O). In this respect, it is preferable to set the aperture ratio as no less than 15%, and more preferable no less than 23%.

Meanwhile, it is preferable to set the aperture ratio as no greater than 90%, and more preferable no greater than 82% in order to ensure the strength of the punching disc element 54.

In the case of the partial disc element 55, it is preferable to set the aperture ratio (the ratio of the area of the cut part of the disc to the internal sectional area of the gas passing tube 30) as less than 50% and so that more than half of the sectional area of the gas passing tube 30 is closed in order to ensure that the gas passing through the peripheral and the central parts are effectively blended. Meanwhile, it is preferable to set the aperture ratio no less than 20% to keep the pressure loss small.

As a result, it is preferable to set the aperture ratio of the partial disc element 55 in the range of 20 to 50%.

In addition, the gas blending unit 50 can be formed by disposing a obstructing disc in the central part of the internal space of the gas passing tube 30 for obstructing the flow of gas in the central part and allowing gas to pass through the peripheral part.

In this case, the gas A, which is to pass through the central part, is obstructed by the obstructing disc and is guided to the peripheral part and is blended with the gas B, which is passing through the peripheral part, to be guided to the downstream part 42 of the selective oxidative catalyst bed 40.

④ An explanation of how to fix the elements for forming the gas blending unit 50 will be given below. For instance, the washer ring element and the obstructing disc can be fixed into the selective oxidative catalyst bed 40 in addition to being attached to the inner surface of the gas passing tube 30 and, especially when the catalyst support is a fixed-shaped molding such as the honeycomb alumina porous element.

⑤ In addition, an explanation of another possible modification will be given below. Instead of using the washer ring element and the obstructing disc, the gas blending unit 50 can be formed by filling a filler in the peripheral or central part of the selective oxidative catalyst bed 40 for partially obstructing flows of gas.

The Second Embodiment

Figure 8:
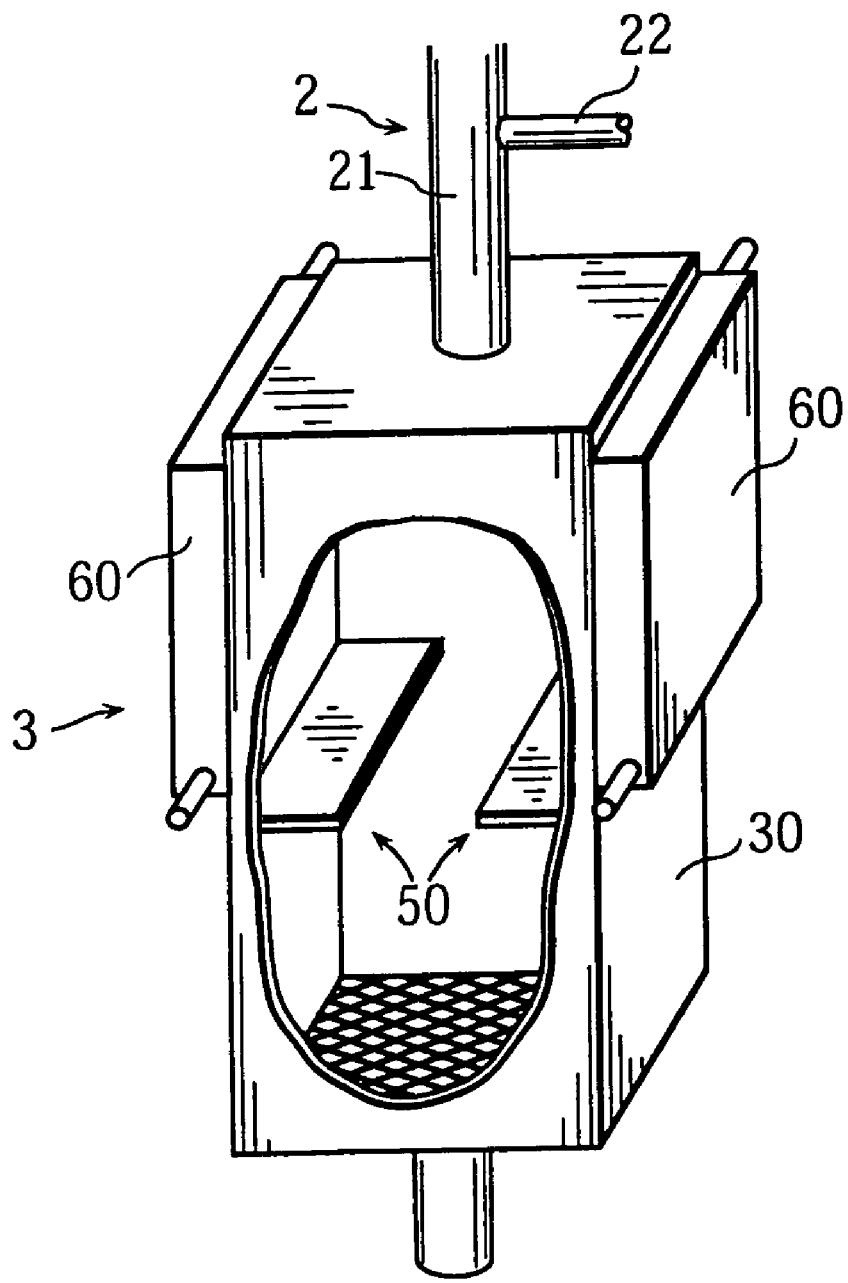
FIG. 8 is a perspective drawing of a quadrangular-prism-shaped CO remover according to the second embodiment of the present invention.

FIG. 8 is a perspective drawing of a quadrangular-prism-shaped CO remover.

When the shape of the gas passing tube 30 is quadrangular prism in the CO remover 1, it is possible to dispose a pair of cooling units 60 so that the upstream part 41 of the selective oxidative catalyst bed 40 is sandwiched between the pair of cooling units 60 although it is possible to dispose the cooling unit 60 so as to surround the upstream part 41 of the selective oxidative catalyst bed 40.

In this case, the gas passes through the upstream part 41 of the selective oxidative catalyst bed 40 has a relatively high temperature in parts that are adjacent to the cooling units 60 (on the right and left sides in FIG. 8). On the other hand, the gas has a relatively low temperature in part that is further from the cooling units 60.

As a result, it is enough to dispose an element that has a shape to obstruct the flow of gas passing through the parts adjacent to the cooling units 60 to form a gas blending unit 50 in order to blend the gas passing through the part adjacent to and further from the cooling units 60. More specifically, it is enough to dispose a pair of rectangular plate elements as shown in FIG. 8.

Also in the case of the quadrangular-prism-shaped CO remover, the preferable range of the width of the elements for ensuring that the gas passing through the parts of the selective oxidative catalyst bed 40 adjacent to the cooling units 60 is effectively guided into the part further from the cooling units 60 to be blended with the gas passing through the part further from the cooling units 60, which shape the gas blending unit 50 is the same as in the case of the cylindrical CO remover as has been described in the first embodiment.

For instance, when a pair of plate elements are disposed on the interior walls of the gas passing tube 30 that oppose to each other so that the plate elements project inward as shown in FIG. 8, it is preferable to set the aperture ratio as no greater than 90%.

At the same time, it is preferable to set the pressure loss as no greater than 300 mmH$_2$O and to set the aperture ratio as no less than 25%.

PRACTICAL EXAMPLES

According to the first embodiment (the cylindrical CO remover shown in FIG. 3), CO removers as practical examples are manufactured according to the specification described below.

At the same time, CO removers including no gas blending unit 50 as comparative examples. Temperatures in the selective oxidative catalyst beds and the CO concentrations in the reformed gas are measured during operation of the CO removers as practical and comparative examples.

Material of the gas passing tube 30: SUS316

Selective oxidative catalyst: Ru/alumina pellet (manufactured by N.E. Chemcat Corporation)

Reformed gas ingredients: hydrogen 79%, carbon dioxide 20%, and carbon monoxide 1% (for all the practical and comparative examples)

Practical Example 1

L/D is 7. "D" indicates the diameter and "L" indicates the length of the selective oxidative catalyst bed.

One gas blending unit 50 is disposed where L2/L1 is 0.6.

The gas blending unit 50 is a washer ring metal plate.

The washer ring metal plate is 5 mm in thickness.

The ratio of the internal diameter D2 of the washer ring metal plate to the internal diameter D1 of the gas passing tube 30, i.e., D2/D1 is 0.8.

The cooling unit 60 is a water-cooling-type cooling unit and L3/L1 is 0.6.

$O_2/CO$ is 1.7

Temperature is measured in the catalyst bed at nine points at regular intervals from the top end to the bottom end. The first point is 0.5 cm apart from the top end of the catalyst bed.

Practical Example 2

The gas blending units 50 is disposed where L2/L1 is 0.5 and 0.8.

Other conditions are the same as the specification for the practical example 1.

Practical Example 3 L/D is 56.

The gas blending units 50 is disposed where L2/L1 is 0,4, 0.7, and 0.9.

The washer ring metal plate is 2 mm in thickness.

The ratio of the internal diameter D2 of the washer ring metal plate to the internal diameter D1 of the gas passing tube 30, i.e., D2/D1 is 0.8.

The cooling unit 60 is air-cooling-type using a heat sink (the whole area is cooled).

Other conditions are the same as the specification for the practical example 1.

Practical Example 4

The gas blending units 50 is disposed where L2/L1 is 0,2, and 0.7.

Other conditions are the same as the specification for the practical example 1.

Comparative Example 1 O₂/CO is 1.7

No gas blending unit is disposed.

The cooling unit 60 is air-cooling-type using a heat sink (the whole area is cooled).

Other conditions are the same as the specification for the practical example 1.

Comparative Example 2

No gas blending unit is disposed.

The cooling unit 60 is air-cooling-type using a heat sink (the whole area is cooled).

Other conditions are the same as the specification for the practical example 1.

Comparative Example 3

No gas blending unit is disposed.

Other conditions are the same as the specification for the practical example 1.

Comparative Example 4 L/D is 56.

O₂/CO is 1.3

No gas blending unit is disposed.

The cooling unit 60 is air-cooling-type using a heat sink (the whole area is cooled).

Other conditions are the same as the specification for the practical example 1.

(Table 1)

the length between the top length of the catalyst bed and a measurement point by the length of the catalyst bed (the length between the top end to the bottom end of the catalyst bed).

The CO concentration measurement values in FIG. 9 and Table 1 show the points described below.

Regarding the practical examples 1, 2, and 4, the temperatures of all the measurement points in the areas in the direction of the gas flow are relatively even and approximately in the range of 140 to 190° C. In addition, the CO concentrations are relatively low values.

On the other hand, regarding the comparative examples 1 and 3, while the temperatures of the measurement points closer to the top end of the catalyst bed are in the range of 140 to 180° C., the temperature in the downstream part are below 140° C., especially around the bottom end are lower than 100° C. The CO concentrations are tremendously high.

This is because since the CO removers as the practical examples 1, 2, and 4 include gas blending units, the reaction is performed well also downstream. On the other hand, since the CO removers as the comparative examples 1 and 3 includes no gas blending unit, the reaction is not performed well downstream.

Next, the practical example 4 is compared with the practical examples 1 and 2. Regarding the practical example 4, the temperature of a measurement point close to the top end of the catalyst bed is as high as almost 190° C. and the CO concentration is 35 ppm. On the other hand, the temperatures of all the measurement points of the practical examples 1 and 2 are in the range of 140 to 180° C. and relatively even, and the CO concentration is as low as below 10 ppm.

The CO concentration of the practical example 4 is not so low as the practical examples 1 and 2 since the gas blending units are disposed relatively closer to the top end of the catalyst bed (disposed where L2/L1<⅓). Due to the positions of the gas blending units, more oxygen is consumed around the top end of the catalyst bed and enough amount of

TABLE 1

| | L/D | Cooling unit type | O₂/CO ratio | blending unit | CO concentration |
|---|---|---|---|---|---|
| practical example 1 | 7 | water cooling(L3/L1 = 0.6) | 1.7 | one positions | 6 ppm |
| practical example 2 | 7 | water cooling(L3/L1 = 0.6) | 1.7 | two positions | 3 ppm |
| practical example 3 | 56 | air cooling(whole area) | 1.7 | three positions | 6 ppm |
| practical example 4 | 7 | water cooling(L3/L1 = 0.6) | 1.7 | two positions | 35 ppm |
| comparative example 1 | 7 | air cooling(whole area) | 1.0 | none | 4000 ppm |
| comparative example 2 | 7 | air cooling(whole area) | 1.7 | none | |
| comparative example 3 | 7 | water cooling(L3/L1 = 0.6) | 1.7 | none | 6500 ppm |
| comparative example 4 | 56 | air cooling(whole area) | 1.3 | none | |

Table 1 shows the characteristics of the practical and comparative examples and the CO concentrations in the reformed gas.

Figure 9:
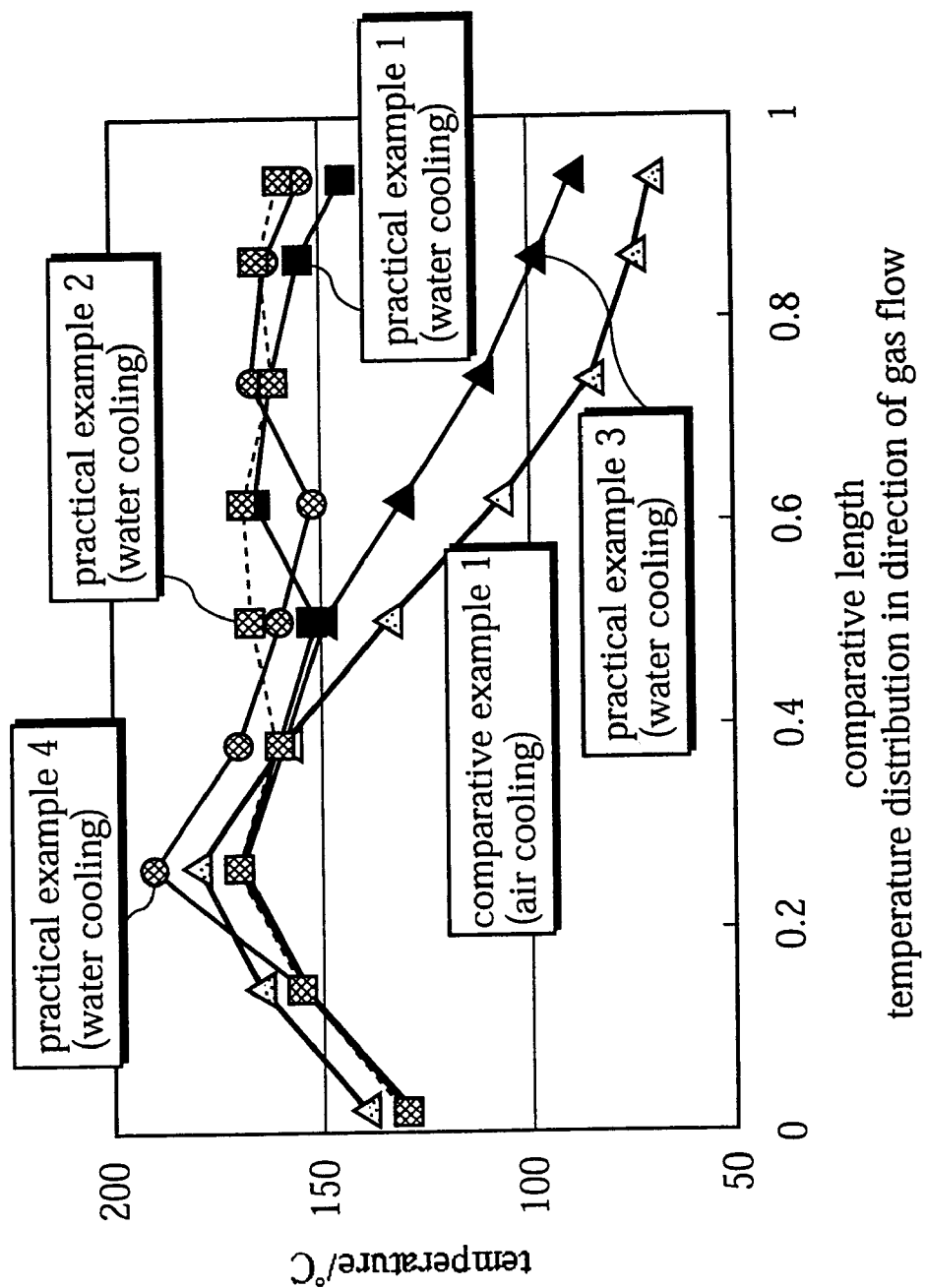
FIG. 9 is a plot showing temperatures in selective oxidative catalyst beds during the operation of CO removers according to the embodiments and comparative examples.
Figure 10:
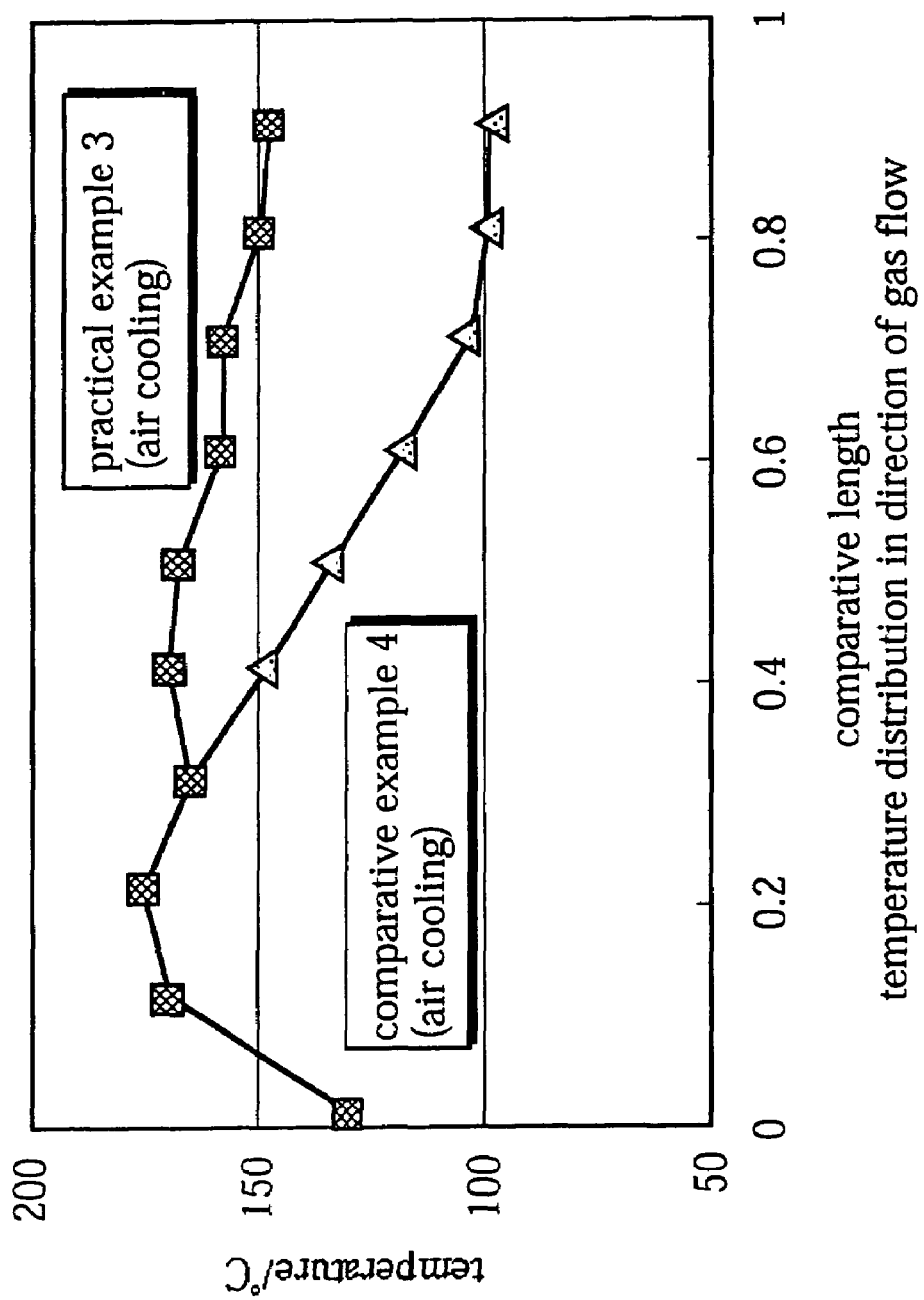
FIG. 10 is a plot showing temperatures in selective oxidative catalyst beds during the operation of CO removers according to the embodiments and comparative examples.

FIG. 9 shows the measurement result of temperatures in the catalyst bed during the operation of the CO removers as the practical examples 1, 2, and 4 and the comparative example 1. FIG. 10 the measurement results of the temperatures during the operation of the CO removers as the practical example 3 and the comparative example 4. Each of FIGS. 9 and 10 is a plot showing the comparative length and measured temperature at each of the measurement points. Note that a comparative length is the value of the division of oxygen is not supplied around the bottom end compared with the practical examples 1 and 2.

This proves that it is preferable to dispose the gas blending unit where L2/L1≧⅓.

Note that the temperatures have a mountain-shaped distribution in which the peak is found at a measurement point in the upstream part and the temperature is as low as around 150° C. at the measurement point where the comparative length (L3/L1) is about ½ for each of the practical examples 1, 2, and 4 and the comparative examples 1 and 3 in FIG. 9.

This concludes that it is preferable to cool the catalyst bed from the top end to the position where the comparative length is about ½ for a CO remover that has a water-cooling-type cooling unit and a catalyst bed of the shape as the practical examples 1, 2, and 4.

On the other hand, FIG. 10 shows the comparison between the practical example 3 and the comparative example 4 each of which has an air-cooling-type cooing unit. The comparison is similar to the comparison in FIG. 9. More specifically, the temperatures of all the measurement points of the practical example 3 are in the range of 140 to 180° C. and relatively even, and the CO concentration is as low as below 10 ppm.

Regarding the comparative example 4, while the temperatures of the measurement points in the upstream part are in the range of 140 to 180° C., the temperatures are below 140° C. in the downstream part, and especially the temperature of the measurement point closest to the bottom end is as low as below 100° C.

Note that the practical example 3 shows a preferable temperature distribution in spite of an air-cooling type cooling unit, which has less cooling power than the water-cooling type cooling unit. It is assumed that the shape of the catalyst bed and the size of the surface area of the gas passing tube contribute to the temperature distribution. The catalyst bed is long in the direction of the gas flow and the surface area of the gas passing tube is relatively large.

In addition, FIG. 10 shows that the temperatures in the downstream of the practical example 3 have a staircase-shaped distribution. This is because a gas blending units are disposed at three positions to the practical example 3 and the temperature rarely declines at the measurement point just downstream from each of the gas blending units.

This proves that it is effective for a CO remover as the practical example 3 that has a catalyst bed long in the direction of the gas flow to have a gas blending unit at a plurality of positions in order to have an even temperature distribution.

[Supplemental Remarks]

As has been described, it is generally preferable for the upstream part of the selective oxidative catalyst bed to be forced to be cooled from the outside with water and air as in the case of the practical examples 1 and 2. Note that, however, it is not necessary to force the upstream part to be cooled when the gas to be guided to the upstream is controlled so that the gas has a relatively low temperature. More specifically, even if the upstream is not forced to be cooled, the gas/passing through the peripheral part cools by itself and has a lower temperature than the gas passing through the central part. As a result, high CO selectivity is obtained by blending the gas passing through the peripheral part with the gas passing through central part by the gas blending unit 50.

In addition, while explanations of CO removers have been given in the first and second embodiment, the present invention is not limited to CO removers. The present invention can be adopted and the same effects can be obtained by a reactor that supplies gas to a catalytic reaction device and has the gas undergo the reaction with exothermic reaction by having the gas pass through the catalytic reaction device.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A CO remover, comprising:
    an air mixer for mixing air with hydrogen-rich gas including CO to generate mixed gas; and
    a selective oxidative catalytic device for selectively oxidizing the CO by having the mixed gas pass through a selective oxidative catalyst bed,
    the selective oxidative catalytic device including:
        a gas passing tube that has the selective oxidative catalyst bed,
        a gas blending unit within the selective oxidative catalyst bed for blending part of the mixed gas that is passing through the selective oxidative catalyst bed further from an inner surface of the gas passing tube and remaining part of the mixed gas that is passing through the selective oxidative catalyst bed nearer to the inner surface of the gas passing tube, and
        a double-walled cylinder with an annular clearance formed therebetween, the cylinder being disposed upstream from the gas blending unit, and
    a cooling mechanism for cooling the selective oxidative catalyst bed with cooling water passing through the annular clearance
    wherein the gas blending unit is formed from an element projecting inward from the inner surface of the gas passing tube so as to partially obstruct the gas passing tube.

2. The CO remover according to claim 1, wherein the cooling mechanism includes a heat sink adjacent to the outer surface of the gas passing tube.

3. The CO remover according to claim 1, wherein the element is circularly disposed around the inner surface of the gas passing tube.

4. The CO remover according to claim 3, wherein 25 to 90% of an internal sectional area of the gas passing tube is obstructed by the element.

5. The CO remover according to claim 3, wherein the element is a washer ring element.

6. The CO remover according to claim 1, wherein an internal diameter of the gas passing tube downstream from the gas blending unit is smaller than an internal diameter of the gas passing tube upstream from the gas blending unit.

7. The CO remover according to claim 6, wherein an internal sectional area of the gas passing tube downstream from the gas blending unit is 25 to 90% of an internal sectional area of the gas passing tube upstream from the gas blending unit.

8. The CO remover according to claim 1, wherein a length between a start of the selective oxidative catalyst bed in a direction of a flow of the mixed gas and the gas blending unit is no shorter than ⅓ of a length between the start of the selective oxidative catalyst bed and an end of the selective oxidative catalyst bed in the direction of the flow of the mixed gas.

* * * * *